Aug. 29, 1950     M. F. HAMPTON     2,520,802

PIPE PATCH

Filed Dec. 1, 1947

Merle F. Hampton, Dec'd.
INVENTOR.
BY THE FIRST NATIONAL BANK AND TRUST COMPANY,
EXECUTOR.
BY Philip A. H. Terrell
ATTORNEYS.

Patented Aug. 29, 1950

2,520,802

UNITED STATES PATENT OFFICE 2,520,802

PIPE PATCH

Merle F. Hampton, deceased, late of Tulsa, Okla., by The First National Bank and Trust Company, Tulsa, Okla., executor Application December 1, 1947, Serial No. 789,121

1 Claim. (Cl. 138—99)

The invention relates to pipe line patches, and has for its object to provide a device of this kind comprising a chambered resilient gasket adapted to be placed over a fracture in a pipe line, and to be clamped in position on the pipe for stopping a leak, and to utilize the pressure in the pipe line for assisting in the sealing of the chambered gasket on the periphery of the pipe.

A further object is to provide the gasket with an inwardly extending flange, surrounding the pipe fracture, and to utilize the escaping pressure into the gasket chamber for forcing the flange into tight engagement with the periphery of the pipe.

A further object is to provide a gasket squeezing plate having its under side provided with a chamber conforming to the shape of the outer portion of the gasket for confining said gasket, so the escaping pressure will act on all parts of the gasket for insuring a positive seal when the saddle clamp is tightened.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
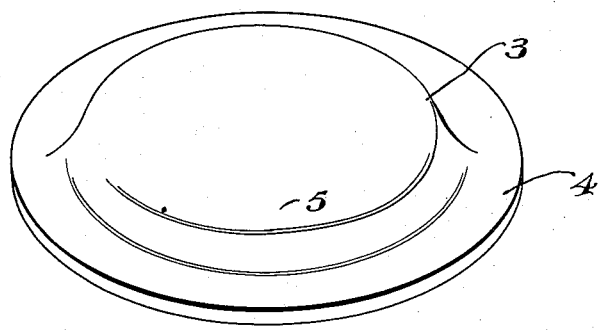
Figure 1 is a perspective view of the gasket.
Figure 2:
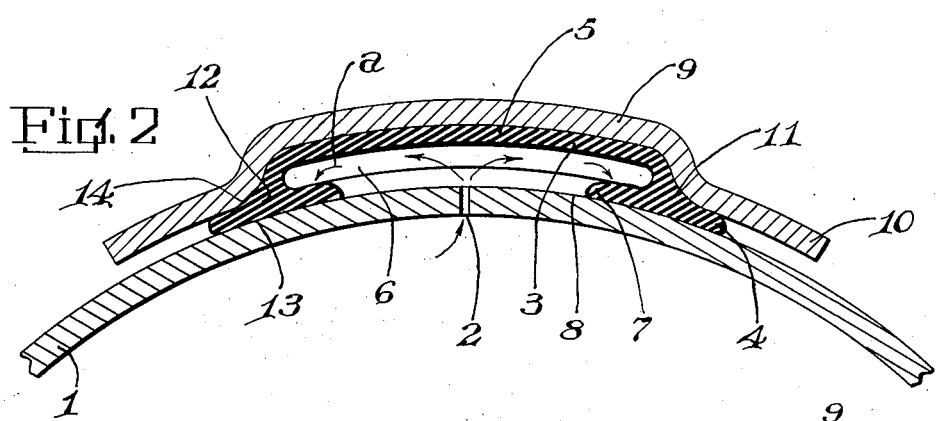
Figure 2 is a vertical transverse sectional view through a portion of a pipe, the gasket and cap plate.
Figures 3, 4:
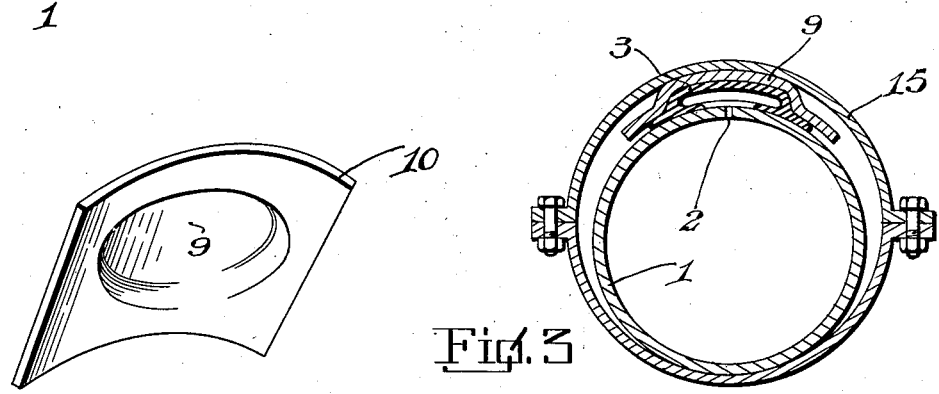
Figure 3 is a view similar to Figure 2, but showing the saddle clamp in position.
Figure 4 is a bottom perspective view of the cap plate.

Referring to the drawing, the numeral 1 designates a portion of a pipe line, and 2 a fracture therein to be patched.

The repair patch comprises a resilient gasket 3 having an annular flange 4 and a central dome portion 5. Disposed within the dome portion 5 is a pressure receiving chamber 6, into which chamber pressure from the fracture 2 passes, for expanding or exerting an expanding action on the walls of the chamber 6. Extending inwardly, entirely around the outer side of the chamber 6 is an annular flange 7, which rests on the periphery 8 of the pipe section 1, and it will be noted that the pressure will be exerted on all the walls of the chamber 6, and downwardly on the upper sides of the flange 7 in the direction of the arrows a, therefore it will be seen that a positive seal is formed, against the periphery 8 of the pipe.

It will be noted that the rigid cap plate 9 will confine the gasket dome. Cap plate 9 is provided with an annular flange 10 which extends beyond the annular flange 4 of the gasket, and that a converging shoulder 11 is formed so that the portion 12 of the gasket, under the influence of the pressure within the chamber 6, will be squeezed outwardly, thereby forming a positive seal at 13 and 14. Cap plate and gasket are clamped in position by a conventional form of saddle clamp 15, which clamp encircles the pipe and engages the outer side of the cap plate.

From the above it will be seen that a pipe patch is provided, which is simple in construction, and one wherein the gasket is not only clamped on the pipe over the fracture, but the force of escaping pressure into the gasket chamber is utilized for expanding the gasket and forming a positive seal.

The invention having been set forth what is claimed as new and useful is:

A clamped leak patch for a pipe having a leak therein, said patch comprising a chambered gasket surrounding a leak and engaging the pipe periphery, a chambered cap plate engaging the outer side of said gasket, said gasket having its chambered portion disposed within the chamber of the cap plate, a clamping member carried by the pipe and clamping the cap plate on the gasket and the gasket compressably against the periphery of the pipe, an outwardly extending flange carried by the gasket, said cap plate having an endless flange engaging the outer face of the annular flange of the gasket and a second annular flange carried by the gasket and extending inwardly within the chambered gasket and positioned whereby accumulated pressure within the chamber of the gasket will exert an inward pressure toward the pipe periphery on the last named flange.

THE FIRST NATIONAL BANK
AND TRUST COMPANY,
By MARION M. LAWELLIN,
Trust Officer.
Executor of the Estate of Merle F. Hampton, Deceased.

REFERENCES CITED

The following references are of record in the file of this patent:

UNITED STATES PATENTS

| Number | Name | Date |
|---|---|---|
| 1,964,642 | McCoy | June 26, 1934 |
| 2,199,552 | Watson | May 7, 1940 |
| 2,279,642 | Schreiner | Apr. 14, 1942 |
| 2,330,022 | Kemper | Sept. 28, 1943 |